(12) United States Patent
Yamamoto et al.

(10) Patent No.: US 10,981,535 B2
(45) Date of Patent: Apr. 20, 2021

(54) GAS GENERATOR

(71) Applicant: DAICEL CORPORATION, Osaka (JP)

(72) Inventors: Koji Yamamoto, Tatsuno (JP); Mikio Yabuta, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 91 days.

(21) Appl. No.: 16/488,352

(22) PCT Filed: Apr. 2, 2018

(86) PCT No.: PCT/JP2018/014083
§ 371 (c)(1),
(2) Date: Aug. 23, 2019

(87) PCT Pub. No.: WO2018/203457
PCT Pub. Date: Nov. 8, 2018

(65) Prior Publication Data
US 2020/0231112 A1    Jul. 23, 2020

(30) Foreign Application Priority Data

May 1, 2017  (JP) .............................. JP2017-091317

(51) Int. Cl.
*B60R 21/264*    (2006.01)
*B60R 21/263*    (2011.01)
*B60R 21/26*    (2011.01)

(52) U.S. Cl.
CPC ........ *B60R 21/2644* (2013.01); *B60R 21/263* (2013.01); *B60R 2021/26011* (2013.01);
(Continued)

(58) Field of Classification Search
CPC ...... B60R 21/2644; B60R 2021/26076; B60R 21/263; B60R 2021/2642; B60R 2021/2648
See application file for complete search history.

(56) References Cited

U.S. PATENT DOCUMENTS

| | | | |
|---|---|---|---|
| 6,199,906 B1 | 3/2001 | Trevillyan et al. | |
| 6,886,856 B2 * | 5/2005 | Canterberry | ........ B60R 21/2644 102/531 |

(Continued)

FOREIGN PATENT DOCUMENTS

WO    WO 2002/051673    * 7/2002

*Primary Examiner* — Ruth Ilan
(74) *Attorney, Agent, or Firm* — Birch, Stewart, Kolasch & Birch, LLP

(57) ABSTRACT

Provided is a gas generator including a housing including a top plate, a bottom plate, and a peripheral wall, the bottom plate being axially opposite the top plate, and the peripheral wall including a gas discharge port and being located between the top plate and the bottom plate. In the gas generator, an internal space of the housing is separated into a first combustion chamber and a second combustion chamber by a partition wall axially and radially partitioning the internal space of the housing, the first combustion chamber being formed to accommodate a first gas generating agent and being on the top plate side, and the second combustion chamber being formed to accommodate a second gas generating agent and being on the bottom plate side. A first igniter and a second igniter are disposed at the bottom plate, the first igniter being configured to burn the first gas generating agent, and the second igniter being configured to burn the second gas generating agent. The partition wall includes a cylindrical portion and an annular portion, the cylindrical portion being formed to surround the first igniter and include a communication hole for making the first combustion chamber and the second combustion chamber to (Continued)

communicate with each other, and the annular portion being formed extend radially outward from a second opening on the top plate side of the cylindrical portion. A first opening of the cylindrical portion axially opposite the second opening is in contact with the first igniter, and an outer periphery of the annular portion is in contact with the peripheral wall of the housing, and, thereby, the first combustion chamber and the second combustion chamber are separated from each other.

5 Claims, 3 Drawing Sheets

(52) U.S. Cl.
CPC ............ *B60R 2021/26029* (2013.01); *B60R 2021/2642* (2013.01); *B60R 2021/2648* (2013.01); *B60R 2021/26076* (2013.01)

(56) References Cited

U.S. PATENT DOCUMENTS

| | | | |
|---|---|---|---|
| 7,044,502 B2* | 5/2006 | Trevillyan | B60R 21/2644 280/736 |
| 7,175,197 B2* | 2/2007 | Iwai | B60R 21/2644 280/736 |
| 7,950,693 B2* | 5/2011 | Jackson | B60R 21/2644 280/741 |
| 8,444,179 B2* | 5/2013 | McFarland | B60R 21/264 280/736 |
| 8,708,367 B2* | 4/2014 | Duvacquier | B60R 21/2644 280/741 |
| 9,487,183 B2* | 11/2016 | Bierwirth | B60R 21/217 |
| 9,994,190 B2* | 6/2018 | Izuma | B01J 7/00 |
| 10,814,828 B2* | 10/2020 | Fukui | B01J 7/00 |
| 2004/0061319 A1* | 4/2004 | Saso | B60R 21/2644 280/741 |
| 2019/0241149 A1* | 8/2019 | Kobayashi | B60R 21/263 |
| 2020/0039463 A1* | 2/2020 | Fukui | F42B 3/12 |
| 2020/0061566 A1* | 2/2020 | Yamamoto | B01J 7/00 |
| 2020/0148158 A1* | 5/2020 | Yamamoto | B60R 21/263 |

* cited by examiner

GAS GENERATOR

TECHNICAL FIELD

The present invention relates to a gas generator used in an occupant restraint system such as an airbag.

BACKGROUND ART

A dual pyro gas generator including an upper combustion chamber and a lower combustion chamber, which are separated by a partition wall, is known as a type of a gas generator including two igniters and two combustion chambers.

A gas generator illustrated in FIG. 1 of U.S. Pat. No. 6,199,906 B1 includes an internal space separated into two combustion chambers, which are a primary combustion chamber 1 and a secondary combustion chamber 2, by a combination of three partition walls of a divider plate 5, a primary combustion chamber enhancer tube 12, and a secondary combustion chamber enhancer tube 13. As a result, the gas generator requires a greater number of components, and thus the number of manufacturing steps is increased.

SUMMARY OF INVENTION

The present invention provides a gas generator including a housing including a top plate, a bottom plate, and a peripheral wall, the bottom plate being located at a position axially opposite the top plate, and the peripheral wall including a gas discharge port and being located between the top plate and the bottom plate. In the gas generator, an internal space of the housing is separated into a first combustion chamber and a second combustion chamber by a partition wall disposed in a manner to axially and radially partition the internal space of the housing, the first combustion chamber is formed to accommodate a first gas generating agent and is provided on the top plate side, and the second combustion chamber is formed to accommodate a second gas generating agent and is provided on the bottom plate side. A first igniter and a second igniter are disposed at the bottom plate, the first igniter is configured to burn the first gas generating agent, and the second igniter is configured to burn the second gas generating agent. The partition wall includes a cylindrical portion and an annular portion, the cylindrical portion is formed to surround the first igniter and includes a communication hole for communicating the first combustion chamber with the second combustion chamber, and the annular portion is formed to extend radially outward from a second opening on the top plate side of the cylindrical portion. A first opening of the cylindrical portion axially opposite the second opening is in contact with the first igniter, and an outer periphery of the annular portion is in contact with the peripheral wall of the housing, and, thereby, the first combustion chamber and the second combustion chamber are separated from each other.

BRIEF DESCRIPTION OF DRAWINGS

The present invention will be more fully understood from the following detailed description and the accompanying drawings. However, the detailed description and the drawings are merely provided for the purpose of illustration and are not intended to limit the present invention.

DESCRIPTION OF EMBODIMENTS

Figure 1:
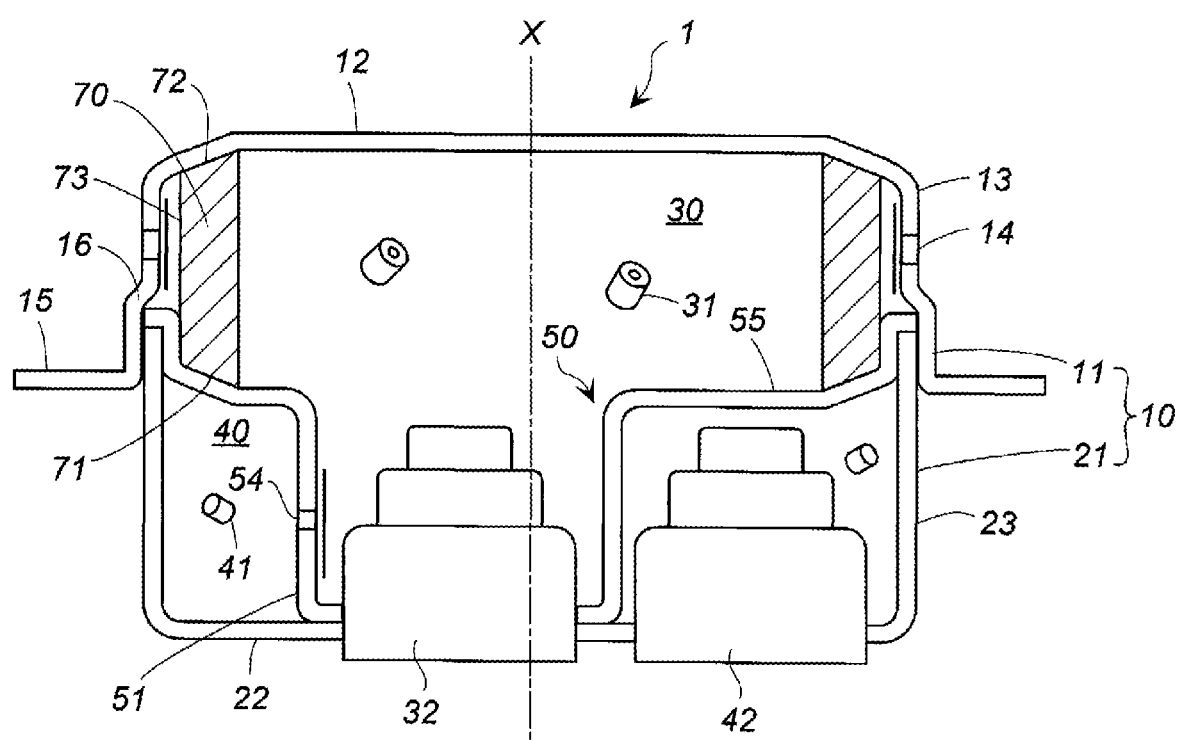
FIG. 1 is a cross-sectional view in an X-axis direction of a gas generator according to the present invention.
Figure 2:
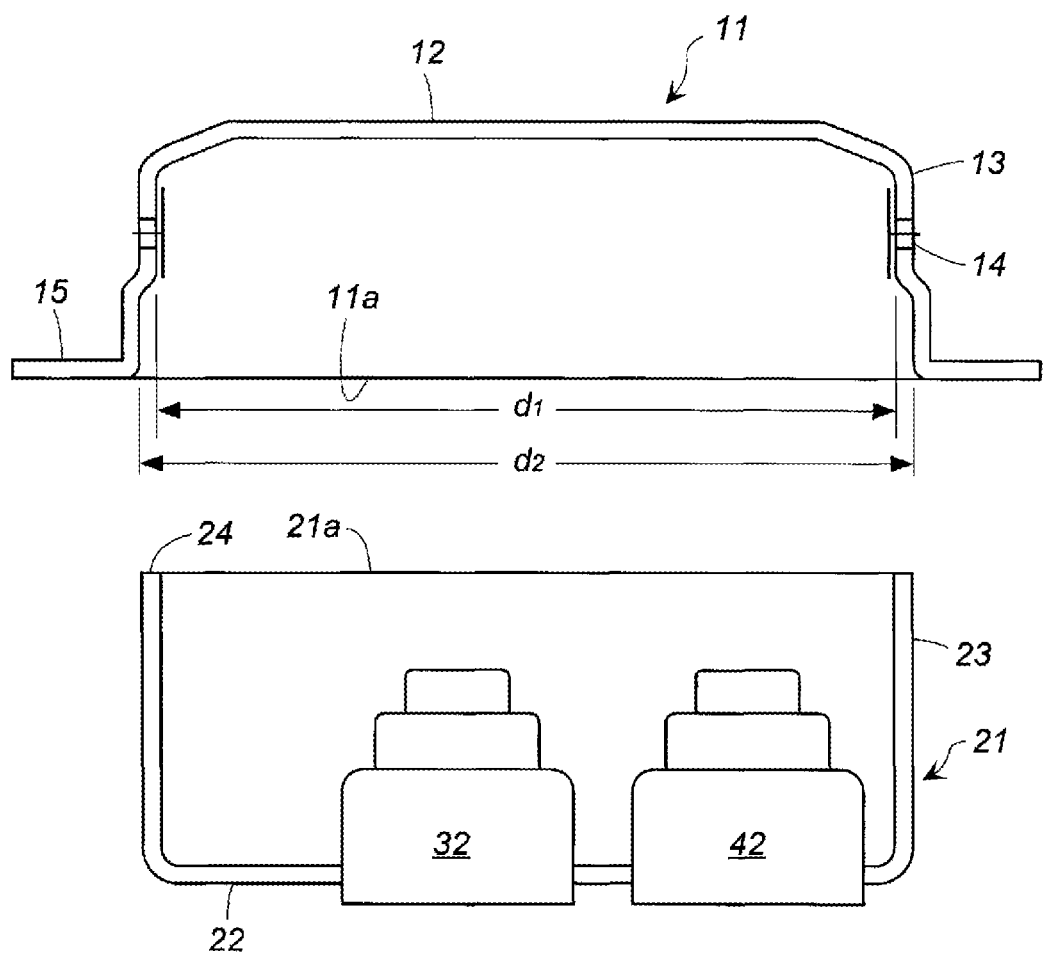
FIG. 2 is a cross-sectional view of only a housing illustrated in FIG. 1, in which an igniter is also illustrated.

The present invention provides a gas generator that has a simple structure and can be easily assembled.

In the gas generator according to an embodiment of the present invention, an internal space of a housing is separated vertically by a single partition wall into two chambers, which are an upper chamber and a lower chamber, in a state in which a bottom plate of the housing is placed at a lower side and a top plate of the housing is placed at an upper side. The upper chamber is a first combustion chamber and the lower chamber is a second combustion chamber.

The housing is made of metal such as iron or stainless steel.

A first gas generating agent in the first combustion chamber is ignited and burned by a first igniter, and a second gas generating agent in the second combustion chamber is ignited and burned by a second igniter. Any known igniter, such as an igniter, in which an igniter body including an ignition portion is integrated with a metal collar via a resin, can be used as the first igniter and the second igniter. The first igniter and the second igniter are attached to holes formed in the bottom plate, respectively.

The partition wall is a component including a cylindrical portion and an annular portion, and is made of metal such as iron or stainless steel. Although the cylindrical portion and the annular portion are preferably integrally formed, the cylindrical portion and the annular portion, which are prepared as separate members but joined together by welding, etc., may be used. The dimensions of the cylindrical portion and the annular portion may be adjusted appropriately, allowing the cylindrical portion and the annular portion to be fixed by press-fitting into the housing.

The cylindrical portion includes a peripheral wall, a first opening on the bottom plate side, and a second opening on the top plate side. The peripheral wall includes one or a plurality of communication holes for communicating the first combustion chamber with the second combustion chamber. The communication hole is closed, from inside, by a closing member such as a metal sealing tape. Therefore, when a load or pressure is applied from the inside of the cylindrical portion, it is possible to obtain a larger burst pressure on the closing member than when the closing member is attached from outside.

The annular portion has a shape extending radially outward from the second opening of the cylindrical portion, and includes a planar surface, a curved surface, or a stepped surface, or a combination of a planar surface, a curved surface, and a stepped surface.

The cylindrical portion axially extends to surround the first igniter, and thus the first igniter is separated from the second combustion chamber. The annular portion radially extends and thus vertically separates the first combustion chamber from the second combustion chamber in the housing.

The second opening of the cylindrical portion faces the inside of the first combustion chamber, and the first igniter is in contact with the first gas generating agent. However, alternatively, a transfer charge contained in a bag-shaped container or the like may be disposed between the first igniter and the first gas generating agent.

When the first igniter is actuated and a combustion product such as a flame is generated, the first gas generating agent in the first combustion chamber is ignited and burned, and thus combustion gas is generated and discharged from a gas discharge port. At this time, the actuation of the first igniter does not cause the ignition of the second gas generating agent in the second combustion chamber. This is because the first combustion chamber and the second combustion chamber are partitioned by the partition wall, and the communication hole of the cylindrical portion still remains in the closed state by the closing member.

When the second igniter is actuated and a combustion product such as a flame is generated, the second gas generating agent in the second combustion chamber is ignited and burned, and thus combustion gas is generated. The combustion gas generated in the second combustion chamber breaks the closing member at the communication hole formed in the cylindrical portion of the partition wall and flows into the cylindrical portion of the partition wall. Then the combustion gas flows through the first combustion chamber and is discharged from the gas discharge port.

The gas generator according to an embodiment of the present invention can be easily assembled, since the first combustion chamber and the second combustion chamber are separated by the partition wall that has a structure in which the cylindrical portion and the annular portion are integrated.

In addition, with the first combustion chamber and the second combustion chamber being separated by one partition wall, inter-component contact occurs only between the partition wall and the housing, and there is no contact among multiple components, unlike the gas generator disclosed in U.S. Pat. No. 6,199,906 B1. As a result, it becomes easier to prevent combustion gas leakage from the first combustion chamber into the second combustion chamber. For example, the cylindrical portion and the annular portion can be formed integrally by pressing a plate material.

Furthermore, since the cylindrical portion and the annular portion are integrated, the pressure upon actuation is applied to the entirety of the partition wall. Thus, the partition wall is unlikely to deform and also unlikely to partially be distorted, and as a result, it becomes easier to prevent combustion gas leakage from the first combustion chamber into the second combustion chamber. Additionally, the annular portion functions as a reinforcing means for suppressing deformation of the second opening of the cylindrical portion. Furthermore, when the internal pressure of the first combustion chamber increases by the combustion gas from the first gas generating agent, the cylindrical portion and the annular portion are pressed, as a united body, toward the bottom plate. Thus, the first opening of the cylindrical portion comes into closer contact with the bottom plate of the housing, and as a result, it is possible to prevent unintentional actuation caused by leakage of the combustion gas from the first combustion chamber into the second combustion chamber.

In a preferable aspect of the gas generator according to the present invention, the first igniter is offset from a center axis of the housing, the cylindrical portion of the partition wall includes an annular inner protrusion protruding radially inward from the first opening, the annular portion of the partition wall includes an annular planar surface portion, an annular inclined surface portion, an annular wall surface portion, and a flange, the annular planar surface portion being formed to extend radially outward from the second opening of the cylindrical portion, the annular inclined surface portion being formed to extend from the annular planar surface portion and inclined toward the top plate, the annular wall surface portion being formed to extend, from the annular inclined surface portion, in a direction along the peripheral wall, and the flange being formed at an opening at an end on the top plate side of the annular wall surface portion, and the annular inner protrusion is in contact with the first igniter and the bottom plate, and at least the flange is in contact with the peripheral wall of the housing, and, thereby, the first combustion chamber and the second combustion chamber are separated from each other.

The first igniter is offset from the center axis of the housing, the annular inner protrusion of the cylindrical portion of the partition wall is in contact with a first igniter (metallic collar of the first igniter) and the bottom plate, and the annular portion of the partition wall extends radially outward, whereby, the first combustion chamber and the second combustion chamber are separated from each other.

Since the partition wall includes the annular inner protrusion and the annular inclined surface portion, when the internal pressure of the first combustion chamber increases, the annular inner protrusion, the annular planar surface portion of the annular portion, and the annular inclined surface portion of the annular portion are pressed, as a united body, toward the bottom plate. Thus, the area of contact with respect to the bottom plate and the peripheral wall of the housing increases, and this enhances contact with the bottom plate and the peripheral wall of the housing. As a result, it is possible to prevent unintentional actuation caused by leakage of the combustion gas from the first combustion chamber into the second combustion chamber.

In addition, since the first igniter is offset from the center axis of the housing and the first igniter is in contact with the annular inner protrusion and passes through the first opening, the partition wall can be prevented from rotating after being assembled in the housing, and the fixing strength can be enhanced. The annular inner protrusion is continuously formed 360° along the entire inner circumference of the first opening of the cylindrical portion. The flange is also formed continuously formed 360° along the entire circumference.

In a preferable aspect of the gas generator according to the present invention, the annular planar surface portion includes a protruding portion protruding toward the top plate at a position axially facing an ignition portion of the second igniter, and a recessed portion corresponding to the protruding portion, and the second igniter is disposed in a manner that the ignition portion axially faces the recessed portion.

The protruding portion and the recessed portion having a shape corresponding to the protruding portion each preferably include a curved surface such as a hemispherical surface. The protruding portion is formed on the first combustion chamber side of the annular planar surface portion, and the recessed portion is formed, at a position corresponding to the protruding portion, on the second combustion chamber side of the annular planar surface portion. The recessed portion is preferably a curved surface, because, in the second combustion chamber, the curved surface facilitates diffusion of the combustion product, such as flames, generated by the actuation of the second igniter.

As described above, when the first igniter is actuated and the first gas generating agent is ignited and burned to generate combustion gas, whereby the increased internal pressure of the first combustion chamber generates force applied in both axial directions (both the direction of the top plate and the direction of the bottom plate), the annular planar surface portion and the annular inclined surface portion of the annular portion are pressed toward the bottom plate. At this time, even if the annular planar surface portion is deformed and protruded toward the bottom plate, the recessed portion prevents the annular planar surface portion from coming into contact with the ignition portion of the second igniter. As a result, the deformation of the annular planar surface portion does not affect a cleavage of the ignition portion of the second igniter.

In a preferable aspect of the gas generator according to the present invention, the housing is formed by a combination of a diffuser shell and a closure shell, the diffuser shell includes the top plate, a first peripheral wall including the gas discharge port, and a first opening opposite the top plate, the first peripheral wall includes an annular surface portion that is positioned between the gas discharge port and the first opening and that is formed by a difference (d2>d1) between an inner diameter (d1) of a portion where the gas discharge port is formed and an inner diameter (d2) of a portion leading to the first opening, the closure shell includes the bottom plate, a second peripheral wall, and a second opening opposite the bottom plate, the second peripheral wall of the closure shell is fitted into the first peripheral wall of the diffuser shell, and the annular wall surface portion of the annular portion of the partition wall is in contact with the second peripheral wall of the closure shell, and the flange of the annular portion of the partition wall is sandwiched between an annular end surface of the second opening of the closure shell and the annular surface portion of the diffuser shell.

The housing is formed by the combination of the diffuser shell and the closure shell, and the second peripheral wall of the closure shell is fitted into the first peripheral wall of the diffuser shell. The diffuser shell and the closure shell are welded together at a portion where the diffuser shell contacts with the closure shell.

Since the second peripheral wall of the closure shell is fitted into the first peripheral wall of the diffuser shell, the annular end surface of the second opening of the closure shell is positioned inside the housing. Therefore, the flange of the partition wall is in contact with the annular end surface. Furthermore, the flange of the partition wall is sandwiched between the annular end surface of the second opening and the annular surface portion of the diffuser shell, and the annular wall surface portion of the partition wall is in contact with the second peripheral wall of the closure shell, and thus the partition wall is fixed and prevented from moving axially and radially. As a result, when pressure upon actuation is applied to the partition wall, the partition wall is in a securely fixed state, and the close contact between the partition wall and the housing is maintained.

In a preferable aspect of the gas generator according to the present invention, a cylindrical filter is further included, a first end surface of the cylindrical filter is in contact with the top plate, a second end surface of the cylindrical filter is in contact with the annular inclined surface portion of the annular portion of the partition wall, and a portion of an outer peripheral surface of the cylindrical filter is in contact with an annular wall surface portion and the cylindrical filter is disposed in a manner that a gap is formed between the portion of the outer peripheral surface and the gas discharge port formed in the peripheral wall.

Since the second end surface of the cylindrical filter is in contact with the annular inclined surface, the height of which increases radially outward, movement of the cylindrical filter is prevented, even when, upon actuation, the increased pressure inside the first combustion chamber generates a force applied radially outward to the cylindrical filter. Therefore, the gap between the cylindrical filter and the gas discharge port in the peripheral wall of the housing is maintained, and the combustion gas is discharged smoothly, which is preferable.

The gas generator according to the present invention can be easily assembled because of having a structure in which the first combustion chamber on the top plate side of the housing and the second combustion chamber on the bottom plate side of the housing are separated by the single partition wall disposed in a manner to radially and axially partition the internal space of the housing. Furthermore, deformation of the partition wall can be suppressed.

The gas generator according to the present invention can be used for an airbag device mounted in an automobile.

An embodiment of a gas generator according to the present invention will be described with reference to FIGS. 1 to 4.

A gas generator 1 includes a housing 10 provided with a diffuser shell 11 and a closure shell 21. Both the diffuser shell 11 and the closure shell 21 are made of iron, stainless steel, or the like.

The diffuser shell 11 includes a top plate 12, a first peripheral wall 13, and a first opening 11a. The first peripheral wall 13 includes a plurality of gas discharge ports 14 arranged at circumferentially even intervals. The first peripheral wall 13 includes a flange 15 at the first opening 11a.

The first peripheral wall 13 includes an annular surface portion 16 positioned between the gas discharge ports 14 and the first opening 11a. The annular surface portion 16 is formed with a difference (d2>d1) between the inner diameter (d1) of a portion where the gas discharge ports 14 are formed and the inner diameter (d2) of a portion leading to the first opening 11a.

The plurality of gas discharge ports 14 are closed from the inside by a metallic sealing tape.

The closure shell 21 has a bottom plate 22, a second peripheral wall 23, and a second opening 21a.

Two holes spaced from each other are formed in the bottom plate 22, and a first igniter 32 is attached to one of the two holes and a second igniter 42 is attached to the other of the two holes.

The first igniter 32 is disposed at a position close to a center axis X of the housing 10, but is offset from the center axis X. The second igniter 42 is positioned further away from the center axis X of the housing 10 than the first igniter 32 is.

In the embodiment illustrated in FIG. 1, the first igniter 32 is disposed in a manner that the center axis of the first igniter 32 is offset by a distance equal to 20 to 30% of the distance from the center axis X to the second peripheral wall 23. Furthermore, in the embodiment illustrated in FIG. 1, the second igniter 42 is disposed in a manner that the center axis of the second igniter 42 is offset by a distance equal to 40 to 60% of the distance from the center axis X to the second peripheral wall 23.

Figure 4:
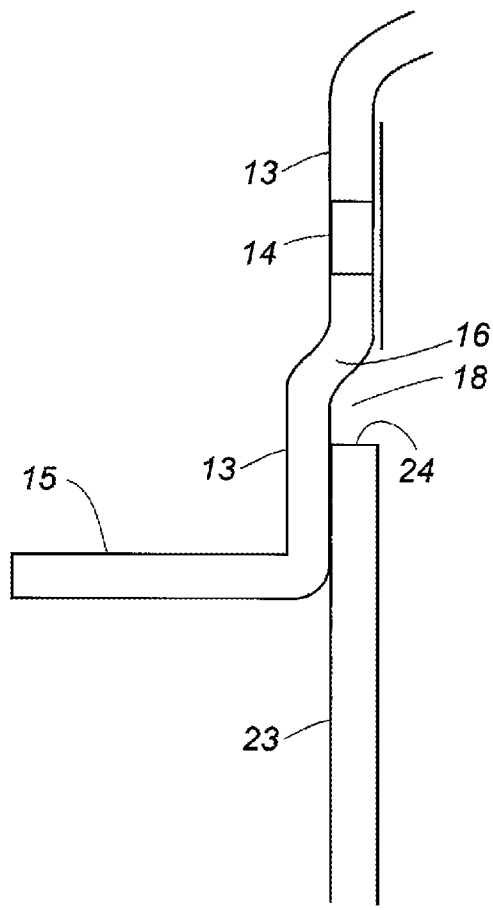
FIG. 4 is a partial enlarged cross-sectional view of the housing illustrated in FIG. 1.

In the housing 10, a portion of the inner surface of the first peripheral wall 13 of the diffuser shell 11, which is near the first opening 11a, contacts with a portion of the outer surface of the second peripheral wall 23 of the closure shell 21, which is near the second opening 21a, and these portions are fixed to each other by welding. Because, in the housing 10, the closure shell 21 is inserted into the diffuser shell 11, an annular end surface 24 of the second peripheral wall 23 faces the inside of the housing 10, as illustrated in FIGS. 1 and 4.

At the portion where the diffuser shell 11 is connected with the closure shell 21, an annular groove 18 formed of the annular surface portion 16, the annular end surface 24, and the first peripheral wall 13 is provided.

A partition wall 50 extends in an axial direction and a radial direction and separates the internal space of the housing 10 into a first combustion chamber 30 on the top plate 12 side and a second combustion chamber 40 on the bottom plate 22 side.

The first combustion chamber 30 accommodates a first gas generating agent 31 that is in contact with an ignition portion of the first igniter 32, and the second combustion chamber 40 accommodates a second gas generating agent 41 that is in contact with the second igniter 42. The ignition portion is a portion for accommodating an ignition charge. Upon actuation, a combustion product such as a high-temperature gas or a flame is generated in the ignition portion. The second gas generating agent 41 is filled in a state of being in contact with the ignition portion.

In the first combustion chamber 30, as necessary, a transfer charge contained in a bag-shaped container can be disposed between the first igniter 32 and the first gas generating agent 31. As the bag-shaped container, a container that is readily meltable, rupturable, or breakable by actuation of the first igniter or combustion of the transfer charge is used.

Figure 3:
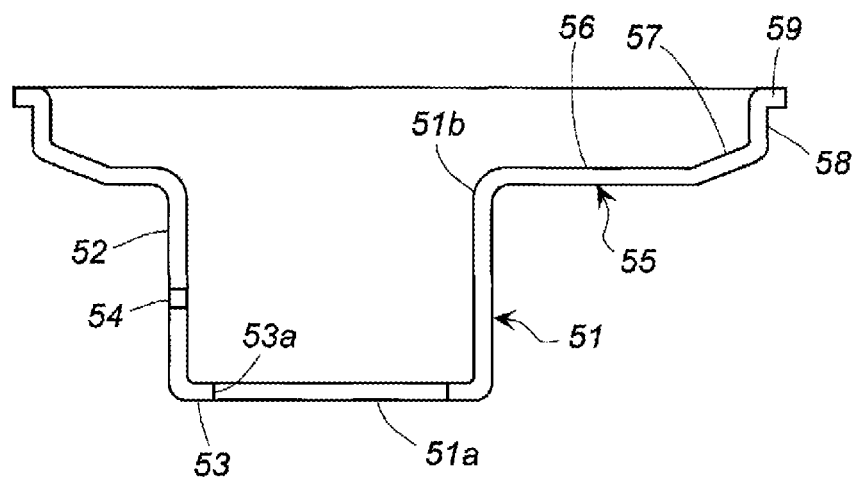
FIG. 3 is a cross-sectional view of a partition wall illustrated in FIG. 1.

The partition wall 50 is made of metal such as stainless steel or iron. FIGS. 1 and 3 illustrate an integrally formed partition wall 50. The partition wall 50 includes a cylindrical portion 51 and an annular portion 55.

The cylindrical portion 51 includes a peripheral wall 52, a first opening 51a on the bottom plate 22 side, a second opening 51b on an opposite side to the first opening 51a in the X-axis direction, and an annular inner protrusion 53 that is on the first opening 51a side and protrudes radially inward.

In the peripheral wall 52, a communication hole 54 is formed for allowing the first combustion chamber 30 and the second combustion chamber 40 to communicate with each other upon actuation, and is closed, from the inside, by a metallic sealing tape serving as a closing member.

The annular inner protrusion 53 of the cylindrical portion 51 is in contact with the bottom plate 22, and an annular inner end surface 53a at the edge of the annular inner protrusion 53 is in contact with a metallic collar of the first igniter 32.

The annular portion 55 includes an annular planar surface portion 56 radially extending, similarly to the bottom plate 22, to the outside from the second opening 51b of the cylindrical portion 51, an annular inclined surface portion 57 extending from the annular planar surface portion 56 and inclined toward the top plate 12, an annular wall surface portion 58 formed to extend, from the annular inclined surface portion 57, in a direction along the peripheral wall (the first peripheral wall 13 and the second peripheral wall 23), and a flange 59 formed at an opening of the annular wall surface portion 58.

Regarding the annular portion 55, the annular wall surface portion 58 is in contact with the second peripheral wall 23 of the closure shell 21, and the flange 59 is positioned in the annular groove 18 in a state of being sandwiched between the annular end surface 24 and the annular surface portion 16.

In the interior of the housing 10, the first combustion chamber 30 is separated from the second combustion chamber 40 by the cylindrical portion 51 of the partition wall 50 extending in the X-axis direction, and by the annular portion 55 of the partition wall 50 extending in the radial direction.

The annular planar surface portion 56 of the partition wall 50 may include a protruding portion protruding toward the top plate 12 at a position axially facing the ignition portion of the second igniter 42, and a recessed portion corresponding to the protruding portion. When the recessed portion is provided, the ignition portion of the second igniter 42 is disposed in a manner to oppose the recessed portion in the X-axis direction.

The inner diameter of the annular inner protrusion 53 (the annular inner end surface 53a) of the cylindrical portion 51, the outer diameter of the metallic collar of the first igniter 32, the outer diameter of the annular portion 55, an inner diameter of the housing 10, and a height of the partition wall 50, etc., are adjusted, and thus, the partition wall 50 is attached by press-fitting.

In the embodiment illustrated in FIG. 1, a cylindrical filter 70 is disposed.

The cylindrical filter 70 has a first end surface 72 that is in contact with the top plate 12, a second end surface 71 that is in contact with the annular inclined surface portion 57, and an outer peripheral surface 73, the lower portion (a portion on the bottom plate 22 side) of which is in contact with the annular wall surface portion 58. A cylindrical gap is formed between the cylindrical filter 70 and the first peripheral wall 13 including the gas discharge ports 14.

In the embodiment illustrated in FIG. 1, the top plate 12 opposite the annular angled surface portion 57 in the X-axis direction has also an inclined surface having a similar shape to the annular inclined surface portion 57. However, the top plate 12 may have a planar shape.

Next, an embodiment of a method for assembling the gas generator 1 will be described.

The first igniter 32 is attached to one of the two holes in the bottom plate 22 of the closure shell 21 and the second igniter 42 attached to the other of the two holes.

Next, the second gas generating agent 41 is placed in the second combustion chamber 40.

Next, the partition wall 50 is press-fitted, with the annular inner protrusion 53 of the cylindrical portion 51 being made to come into contact with the bottom plate 22, the annular inner end surface 53a being made to come into contact with the metallic collar of the first igniter 32, the annular wall surface portion 58 being made to come into contact with the second peripheral wall 23 of the closure shell 21, and the flange 59 being made to come into contact with the annular end surface 24.

Next, the cylindrical filter 70 is disposed, and then the first gas generating agent 31 is placed in the first combustion chamber 30.

Then, the diffuser shell 11 is fitted onto the outside of the closure shell 21. At this time, the flange 59 of the partition wall 50 is positioned within the annular groove 18 in a state of being sandwiched between the annular end surface 24 and the annular surface portion 16.

Next, the portion where the diffuser shell 11 contacts with the closure shell 21 is welded.

Operation of an airbag device attached with the gas generator 1 illustrated in FIG. 1 will be described.

The gas generator 1 according to the embodiment of the present invention is particularly effective in a case in which the first igniter 32 is actuated first, and then the second igniter 42 is actuated, or a case in which only the first igniter 32 is actuated. The following example describes the case in which the first igniter 32 is actuated first, and then the second igniter 42 is actuated.

When the first igniter 32 is actuated first, the first gas generating agent 31 in the first combustion chamber 30 is ignited and burned by flames, etc. generated by the first igniter 32, and as a result, combustion gas is generated.

The combustion gas passes through the cylindrical filter 70, and then breaks the sealing tape. As a result, the combustion gas is discharged from the gas discharge ports 14 to inflate the airbag.

When the pressure inside the first combustion chamber 30 increases due to the combustion gas, the annular inner protrusion 53 of the partition wall 50 is pressed against the bottom plate 22, the annular wall surface portion 58 is pressed against the second peripheral wall 23 of the closure shell 21, and the flange 59 in the annular groove 18 is pressed against the first peripheral wall 13. The communication hole 54 is closed, from the inside of the peripheral wall 52, by the metallic sealing tape that withstands a high burst pressure and does not break, and thus the combustion gas does not leak from the first combustion chamber 30 into the second combustion chamber 40.

With the partition wall 50 receiving, in the entirety thereof, the pressure upon actuation, and, in particular, the annular inner protrusion 53 being formed in the first opening 51*a* and the annular portion 55 being formed in the second opening 51*b,* the partition wall is unlikely to deform in the entirety thereof and is unlikely to partially be distorted. As a result, the combustion gas is further prevented from leaking from the first combustion chamber 30 to the second combustion chamber 40.

After a slight delay, the second igniter 42 is actuated, and the second gas generating agent 41 in the second combustion chamber 40 is ignited and burned, whereby combustion gas is generated.

The second igniter 42 is preferably disposed in a state of facing the partition wall 50 (the annular planar surface portion 56 of the annular portion 55). This is because, when the second igniter 42 is actuated, flames, etc., resulting therefrom collide with the partition wall 50, and thus diffusion of the flames, etc. is facilitated, whereby the ignitability of the second gas generating agent 41 is improved. This arrangement is particularly preferable in an embodiment, in which a recessed portion is formed in the annular planar surface portion 56 of the partition wall 50 and thus a gap is formed between the ignition portion of the second igniter 42 and the partition wall 50, because the effect described above appears prominently and the partition wall does not affect the rupture resulting from the ignition of the second igniter 42.

The combustion gas generated in the second combustion chamber 40 enters the first combustion chamber 30 through the communication hole 54 of the cylindrical portion 51. Then, after passing through the cylindrical filter 70, the combustion gas is discharged from the gas discharge ports 14 and inflates the airbag. The pressure from the second combustion chamber 40 side easily detaches, from the peripheral wall 52, the metal sealing tape covering the communication hole 54.

The present invention has been described as above. Of course, the present invention includes variations in various forms within the scope thereof, and these variations are not to be regarded as departure from the scope of the present invention. Also, all modifications that will be clearly deemed by one skilled in the art as variation of the present invention are included within the scope of the following claims.

The invention claimed is:

1. A gas generator, comprising:
   a housing including
      a top plate;
      a bottom plate; and
      a peripheral wall,
   the bottom plate being located at a position axially opposite the top plate, and the peripheral wall including a gas discharge port and being located between the top plate and the bottom plate,
   wherein
   an internal space of the housing is separated into a first combustion chamber and a second combustion chamber by a partition wall disposed in a manner to axially and radially partition the internal space of the housing, the first combustion chamber is formed to accommodate a first gas generating agent and is provided on the top plate side, and the second combustion chamber is formed to accommodate a second gas generating agent and is provided on the bottom plate side,
   a first igniter and a second igniter are disposed at the bottom plate, the first igniter is configured to ignite and burn the first gas generating agent, and the second igniter is configured to ignite and burn the second gas generating agent,
   the partition wall includes a cylindrical portion and an annular portion, the cylindrical portion is formed to surround the first igniter and includes a communication hole for communicating the first combustion chamber with the second combustion chamber, and the annular portion is formed to extend radially outward from a second opening on the top plate side of the cylindrical portion, and
   a first opening of the cylindrical portion axially opposite the second opening is in contact with the first igniter, and an outer periphery of the annular portion is in contact with the peripheral wall of the housing, and, thereby, the first combustion chamber and the second combustion chamber are separated from each other.

2. The gas generator according to claim 1, wherein
   the first igniter is offset from a center axis of the housing,
   the cylindrical portion of the partition wall includes an annular inner protrusion protruding radially inward from the first opening thereof,
   the annular portion of the partition wall includes an annular planar surface portion, an annular inclined surface portion, an annular wall surface portion, and a flange, the annular planar surface portion is formed to extend radially outward from the second opening of the cylindrical portion, the annular inclined surface portion is formed to extend from the annular planar surface portion and inclined toward the top plate, the annular wall surface portion is formed to extend, from the annular inclined surface portion, in a direction along the peripheral wall, and the flange is formed at an opening at an end on the top plate side of the annular wall surface portion, and
   the annular inner protrusion is in contact with the first igniter and the bottom plate, and at least the flange is in contact with the peripheral wall of the housing, and, thereby, the first combustion chamber and the second combustion chamber are separated from each other.

3. The gas generator according to claim 2, wherein
   the annular planar surface portion includes a protruding portion protruding toward the top plate at a position axially facing an ignition portion of the second igniter, and a recessed portion corresponding to the protruding portion, and the second igniter is disposed in a manner that the ignition portion axially faces the recessed portion.

4. The gas generator according to claim 2, wherein the housing is formed by a combination of a diffuser shell and a closure shell, the diffuser shell includes the top plate, a first peripheral wall including the gas discharge port, and a first opening opposite the top plate, the first peripheral wall includes an annular surface portion that is positioned between the gas discharge port and the first opening and that is formed by a difference (d2>d1) between an inner diameter (d1) of a portion where the gas discharge port is formed and an inner diameter (d2) of a portion leading to the first opening, the closure shell includes the bottom plate, a second peripheral wall, and a second opening opposite the bottom plate, the second peripheral wall of the closure shell is fitted into the first peripheral wall of the diffuser shell, and the annular wall surface portion of the annular portion of the partition wall is in contact with the second peripheral wall of the closure shell, and the flange of the annular portion of the partition wall is sandwiched between an annular end surface of the second opening of the closure shell and the annular surface portion of the diffuser shell.

5. The gas generator according to claim 2, further comprising a cylindrical filter, wherein a first end surface of the cylindrical filter is in contact with the top plate, a second end surface of the cylindrical filter is in contact with the annular inclined surface portion of the annular portion of the partition wall, and a portion of an outer peripheral surface of the cylindrical filter is in contact with an annular wall surface portion and the cylindrical filter is disposed in a manner that a gap is formed between the portion of the outer peripheral surface and the gas discharge port formed in the peripheral wall.

* * * * *